United States Patent [19]

Da Silva

[11] 4,313,449
[45] Feb. 2, 1982

[54] ROTOR OF THRASHING SECTION OF CROP HARVESTING MACHINE

[75] Inventor: Jose T. Da Silva, Ribeirao Preto, Brazil

[73] Assignee: Cia Penna de Maquinas Agricolas-COPEMAG, Brazil

[21] Appl. No.: 143,175

[22] Filed: Apr. 24, 1980

[30] Foreign Application Priority Data

Apr. 25, 1979 [BR] Brazil .............................. 5900551[U]

[51] Int. Cl.³ ............................................. A01F 12/18
[52] U.S. Cl. .................................... 130/27 T; 56/14.6
[58] Field of Search .............. 130/27 T, 27 H, 27 HF, 130/27 HA; 56/14.6

[56] References Cited

U.S. PATENT DOCUMENTS

| 4,178,943 | 12/1979 | West | 130/27 T |
| 4,186,753 | 2/1980 | Todd | 130/27 T |
| 4,192,322 | 3/1980 | Wilson | 130/27 T |

*Primary Examiner*—Robert A. Hafer
*Attorney, Agent, or Firm*—Robert E. Burns; Emmanuel J. Lobato; Bruce L. Adams

[57] ABSTRACT

The rotor of the thrashing section of a crop harvesting machine comprises a helicoidal vane which extends helically around a cylindrical body. L-shaped pins mounted on the rim of the helicoidal vane can be turned at different angles. By adjusting these pins, a greater or lesser thrashing of the crop is achieved. The rotor operates in the interior of a cylindrical screen which has a mesh-size that allows only the passage of cleaned grains while straw and chaff are exhausted at the rear by a fan.

2 Claims, 3 Drawing Figures

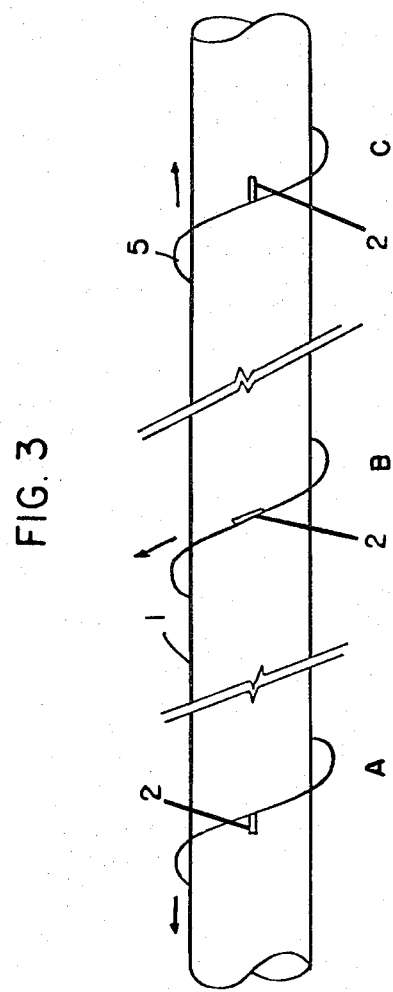

ROTOR OF THRASHING SECTION OF CROP HARVESTING MACHINE

The present invention relates to a rotor carrying helicoidal vanes, used in crop harvesting machines to which have been added certain parts which help to perfect its function and to distinguish it from the prior art and which can also be considered a considerable technical advancement in the related field.

Through the description which follows, it will be demonstrated that the element in question shows characteristics which constitute a considerable technical improvement and for that reason justifies the protection of a patent as requested.

The invention will be described in all its details in the following description, reference being made to the accompanying drawings which act as a further illustration of the element in question and in which:

FIG. 3 is a schematic view showing details of the helicoidal vanes and adjustable pins.

Figure 1:
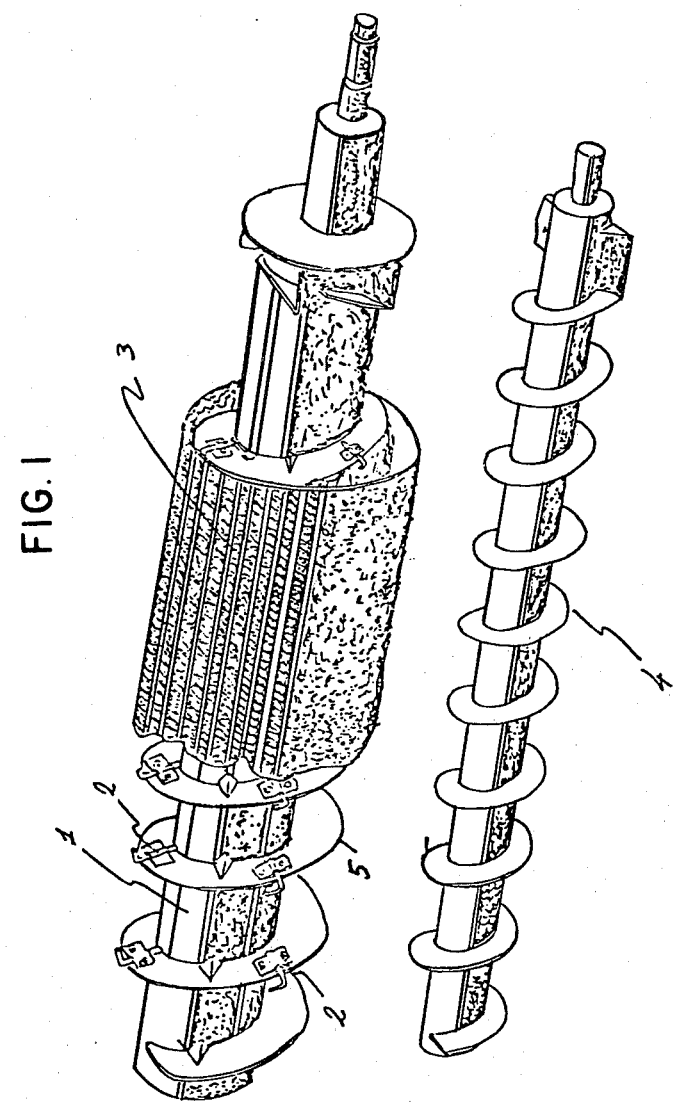
FIG. 1 is a perspective view of the rotor carrying helicoidal vanes.
Figure 2:
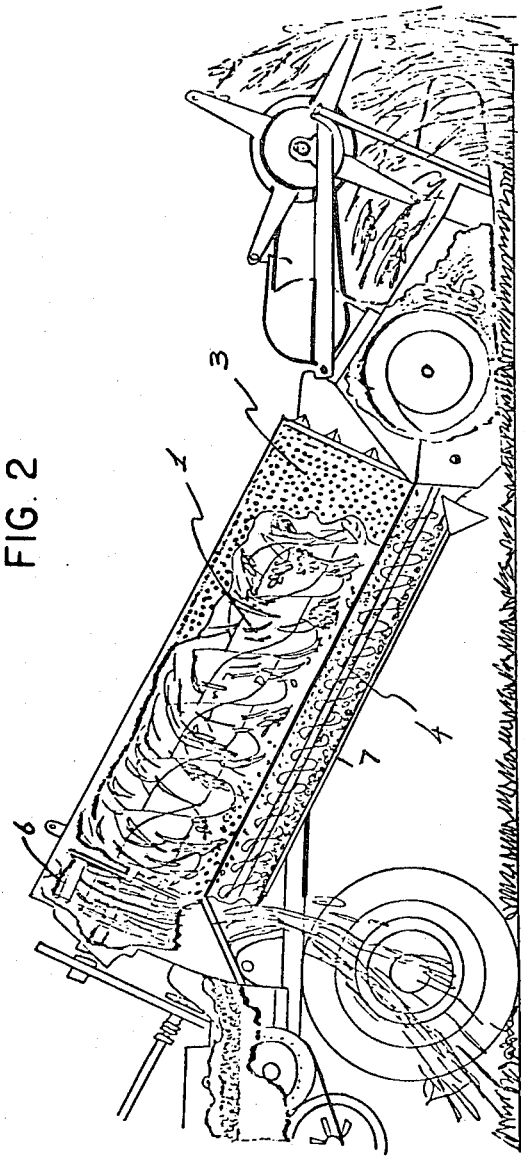
FIG. 2 is a general view in section of the "ROTOR" in operation with a cereal harvester.

The centrifugal thrashing system within which the rotor 1 operates can be graded and adjusted using L-shaped pins which are located on the rim of a helicoidal vane 5. Although only a few of the L-shaped pins 2 are shown, these pins are provided throughout the length of the helicoidal vane and are mounted so that they may be turned at different angles. Moreover, the spacing between the pins can be varied according to the crop to be thrashed. By adjusting these pins, a greater or lesser thrashing of the crop is achieved within the thrashing drum. The pins 12 can also be adjusted radially.

As illustrated by way of example in my copending application Ser. No. 015,606 filed Feb. 23, 1979, the "ROTOR" operates in the interior of a cylindrical screen 3. which has a mesh-size that only allows the passage of cleaned grains while straw and chaff are kept within the cylindrical screen and are exhausted by a fan 6 at the rear end of the rotor as in application Ser. No. 015,606. The screen 3 may be stationary or may rotate. The grains fall into a trough 7 at the base where they are carried by a vaned conducting shaft 4 to the bagging station.

As demonstrated in FIG. 3 the pins are positioned in a specific direction in accordance with the necessities or type of crop to be thrashed. In position at "A" a higher degree of thrashing occurs since the pin stays in contact with the product being thrashed for a longer period of time. In the position at "B" the thrashing is normal while in the position illustrated at "C" the thrashing is least since the pin in this position works together with the vane of the "ROTOR" in disposing of the straw and chaff.

It is obvious from the foregoing that novel characteristics which constitute a technical advance have been introduced and that said characteristics are noteworthy, justifying the protection of letters patent as solicited, since novelties are already known technology are combined in a new and improved form.

What is claimed is:

1. In the thrashing section of a crop harvesting machine, the combination of a cylindrical screen and a rotor rotatable in said cylindrical screen, said rotor comprising a cylindrical body, an outwardly projecting vane extending helically around said body and fixed thereto, and a plurality of pins mounted at the periphery of said vane and projecting outwardly of said vane, said pins being L-shaped and adjustable to different positions according to the requirements for the crop being harvested.

2. The combination according to claim 1, in which said pins are uniformly spaced throughout the full length of said vane.

* * * * *